US008322006B1

(12) United States Patent
Kodi

(10) Patent No.: US 8,322,006 B1

(45) Date of Patent: Dec. 4, 2012

(54) CLIP GUN WITH PNEUMATIC FEED

(75) Inventor: Jon R. Kodi, Lebanon, TN (US)

(73) Assignee: Kodi Klip Corporation, Lebanon, TN (US)

( * ) Notice: Subject to any disclaimer, the term of this patent is extended or adjusted under 35 U.S.C. 154(b) by 370 days.

(21) Appl. No.: 12/762,409

(22) Filed: Apr. 19, 2010

Related U.S. Application Data

(60) Provisional application No. 61/170,719, filed on Apr. 20, 2009.

(51) Int. Cl.
*B23P 11/00* (2006.01)

(52) U.S. Cl. ............. 29/243.56; 29/243.55; 29/243.526; 29/809; 29/818

(58) Field of Classification Search ............... 29/243.56, 29/243.55, 243.57, 243.526, 809, 811.2, 29/816, 818
See application file for complete search history.

(56) References Cited

U.S. PATENT DOCUMENTS

| | | | | |
|---|---|---|---|---|
| 721,434 | A | | 2/1903 | Edeburn |
| 1,451,717 | A | | 4/1923 | Sommer |
| 1,852,673 | A | | 4/1932 | Pilj |
| 1,986,528 | A | | 1/1935 | Ranger |
| 2,551,826 | A | | 5/1951 | Cox, Sr. |
| 2,571,337 | A | | 10/1951 | Burnham |
| 2,879,087 | A | | 3/1959 | Haglund |
| 3,006,115 | A | | 10/1961 | Hillberg |
| 3,216,752 | A | | 11/1965 | Rifken |
| 3,360,883 | A | | 1/1968 | Glanzer |
| 3,461,536 | A | | 8/1969 | Skold |
| 3,694,988 | A | | 10/1972 | Skold |
| 3,788,025 | A | | 1/1974 | Holmes |
| 3,945,238 | A | * | 3/1976 | Eckert ........................ 72/409.03 |
| 4,060,954 | A | | 12/1977 | Liuzza |
| 4,080,770 | A | | 3/1978 | Vigh |
| 4,110,951 | A | | 9/1978 | Padrun |
| 4,136,984 | A | | 1/1979 | Hayashi |
| 4,136,985 | A | | 1/1979 | Taul |
| 4,214,841 | A | | 7/1980 | Hayashi |
| 4,388,791 | A | | 6/1983 | Anderson |
| 4,440,519 | A | | 4/1984 | Pennel et al. |

(Continued)

FOREIGN PATENT DOCUMENTS

JP 04108944 4/1992

OTHER PUBLICATIONS

U.S. Appl. No. 11/142,539, filed Jun. 1, 2005 to Kodi (unpublished).

(Continued)

*Primary Examiner* — William Gilbert
*Assistant Examiner* — Chi Q Nguyen
(74) *Attorney, Agent, or Firm* — Waddey & Patterson, P.C.; Lucian Wayne Beavers

(57) ABSTRACT

A safety shield is provided for a clip applying apparatus which applies plastic clips to connect rebar. The safety shield prevents operation of the apparatus unless a forward end of the apparatus is properly placed against the bars which are to be joined. Other features may include a safety latch which prevents operation if a cover door of the apparatus is open. Another feature which may be included is an anti-jamming mechanism that prevents operation of the apparatus if a string of clips is not properly received within the clip applying apparatus.

20 Claims, 10 Drawing Sheets

U.S. PATENT DOCUMENTS

| | | | | | |
|---|---|---|---|---|---|
| 4,482,088 | A | | 11/1984 | Hyun | |
| 4,511,073 | A | | 4/1985 | Furutsu | |
| 4,610,122 | A | | 9/1986 | De Clercq | |
| 4,617,775 | A | | 10/1986 | Padrun | |
| 4,800,702 | A | | 1/1989 | Wheeler | |
| 4,807,345 | A | | 2/1989 | Jacobson | |
| 4,835,933 | A | | 6/1989 | Yung | |
| 4,858,811 | A | * | 8/1989 | Brosius et al. | 227/10 |
| 4,991,372 | A | | 2/1991 | Sonneville | |
| 5,269,054 | A | | 12/1993 | Poteat et al. | |
| 5,370,293 | A | | 12/1994 | Bevins | |
| 5,371,991 | A | | 12/1994 | Bechtel et al. | |
| D355,582 | S | | 2/1995 | Sleight | |
| 5,518,399 | A | | 5/1996 | Sicurelli, Jr. et al. | |
| 5,588,554 | A | | 12/1996 | Jones | |
| 5,595,039 | A | | 1/1997 | Lowery | |
| 5,626,436 | A | | 5/1997 | Dragone | |
| 5,651,169 | A | * | 7/1997 | Ohuchi et al. | 29/243.525 |
| 5,683,025 | A | | 11/1997 | Grendol | |
| 5,697,591 | A | | 12/1997 | Cooper | |
| 5,752,297 | A | | 5/1998 | Ramey | |
| 5,826,629 | A | | 10/1998 | West | |
| 5,881,452 | A | | 3/1999 | Nowell, III et al. | |
| 5,893,252 | A | | 4/1999 | Hardy et al. | |
| 5,938,099 | A | | 8/1999 | Ciccarelli | |
| 6,148,488 | A | | 11/2000 | Gristock | |
| 6,276,108 | B1 | | 8/2001 | Padrun | |
| 6,354,054 | B1 | | 3/2002 | Verelli et al. | |
| 6,371,763 | B1 | | 4/2002 | Sicurelli, Jr. et al. | |
| 6,513,555 | B1 | | 2/2003 | Lesser et al. | |
| 6,585,142 | B1 | | 7/2003 | Chen | |
| 6,672,498 | B2 | | 1/2004 | White et al. | |
| 6,725,535 | B2 | | 4/2004 | Edson et al. | |
| 6,857,246 | B2 | | 2/2005 | Erbetta et al. | |
| 6,915,624 | B2 | | 7/2005 | Shibazaki et al. | |
| 6,925,698 | B2 | | 8/2005 | Goodsmith et al. | |
| 6,971,515 | B2 | | 12/2005 | Cooper et al. | |
| 7,003,860 | B2 | | 2/2006 | Bloch et al. | |
| D529,794 | S | | 10/2006 | Murray | |
| 7,147,209 | B2 | | 12/2006 | Jones et al. | |
| D534,418 | S | | 1/2007 | Minor et al. | |
| 7,891,074 | B2 | * | 2/2011 | Kodi | 29/525.01 |
| 7,963,392 | B2 | * | 6/2011 | Kodi | 206/340 |
| 2003/0154579 | A1 | | 8/2003 | Disher | |
| 2004/0040247 | A1 | | 3/2004 | Morse | |
| 2004/0154261 | A1 | | 8/2004 | Miller | |
| 2004/0261352 | A1 | | 12/2004 | Bennett et al. | |
| 2005/0217198 | A1 | | 10/2005 | Carraher et al. | |
| 2006/0248844 | A1 | | 11/2006 | Kodi | |
| 2007/0284385 | A1 | | 12/2007 | Carraher et al. | |
| 2008/0115448 | A1 | | 5/2008 | Kodi | |
| 2008/0115449 | A1 | | 5/2008 | Kodi | |
| 2008/0118304 | A1 | | 5/2008 | Carraher et al. | |

OTHER PUBLICATIONS

U.S. Appl. No. 12/818,676, filed Jun. 18, 2010 to Kodi (unpublished).

Jiffy Clip Long Gun Applicator by Jiffy Clip, Inc. (see www.jiffyclip.com).

* cited by examiner

CLIP GUN WITH PNEUMATIC FEED

CROSS-REFERENCES TO RELATED APPLICATIONS

This application is a Non-Provisional Utility Application which claims priority from U.S. Provisional Patent Application Ser. No. 61/170,719 filed by Jon R. Kodi on Apr. 20, 2009 entitled "Clip Gun With Pneumatic Feed" which is hereby incorporated by reference.

BACKGROUND OF THE INVENTION

1. Field of the Invention

The present invention relates to an apparatus and method for attaching clips to connect bars, wherein the bars are used to reinforce concrete. The present invention is particularly applicable for use with bar clips such as those set forth in U.S. Patent Publication No. 2006/0248844 to Kodi, which is assigned to the Assignee of the present invention, the details of which are incorporated herein by reference.

2. Description of the Prior Art

Supporting bars are commonly used to reinforce concrete. The supporting bars are laid out in a grid where the cement is to be poured. To maximize the effectiveness of the supporting bars, they are placed at specific heights, usually between about two and six inches from the ground. The bars are then connected so the grid is stable and will not move when the cement or concrete is poured. Many methods have been used to connect the bars, and many are done by hand. Rebar is the type of supporting bar most commonly use. When the rebar is connected by hand, it requires a laborer to bend over and connect the rebar at many points within the grid. This is labor intensive, slow, and tends to cause injuries from the repeated bending. In some instances, the rebar grid can be prepared first, and then placed into a form where the cement or concrete is to be poured. This can reduce the bending required, but does not address the time and labor required to connect the rebar. To reduce the time needed to connect the rebar and to minimize the time a laborer is working in a stooped over position, several applicators for connecting the rebar have been developed.

Two examples of such clip applicators are shown in U.S. Patent Application Publication No. 2008/0115448 to Kodi entitled "Bar Connecting Apparatus," and U.S. Patent Application Publication No. 2008/0115449 to Kodi entitled "Bar Connecting Apparatus," both of which are assigned to the Assignee of the present invention, and are incorporated herein by reference.

There is a continuing need in the art for further improvements in such clip applying apparatus.

BRIEF SUMMARY OF THE INVENTION

In one aspect an improved clip applying apparatus is provided for applying a clip to first and second reinforcing bars. The apparatus includes a barrel having a distal end and a clip receiving cavity. An alignment head is disposed on the distal end of the barrel. The alignment head has first and second pairs of notches for positioning the barrel against the first and second reinforcing bars when the bars are oriented transversely to each other. The first pair of notches are deeper than the second pair of notches. A hammer is received in the barrel. A main drive is connected to the hammer for reciprocating the hammer within the barrel. A clip track is connected to the barrel. The clip track is aligned with the cavity for guiding a string of frangibly connected clips into the cavity. A safety shield is connected to the barrel. The safety shield includes a forward portion extending distally beyond the alignment head and an actuation arm extending proximally from the forward portion. The safety shield includes at least one notch aligned with the first pair of notches of the alignment head. A trigger assembly is connected to the main drive to actuate reciprocation of the hammer. The trigger assembly includes a safety release operably associated with the actuation arm of the safety shield.

In another aspect of the invention, a clip applying apparatus is provided for applying a clip to first and second reinforcing bars. The apparatus includes a barrel having a distal end and a clip receiving cavity. An alignment head is disposed on the distal end of the barrel. The alignment head has first and second pairs of notches for positioning the barrel against first and second transverse reinforcing bars. The first pair of notches are deeper than the second pair of notches. A hammer is received in the barrel. A main drive is connected to the hammer for reciprocating the hammer within the barrel. A clip track is connected to the barrel. The clip track has a longitudinal axis extending transversely from the barrel and aligned with the cavity for guiding a string of frangibly connected clips into the cavity. The longitudinal axis of the clip track is generally parallel to an alignment direction defined by the first pair of notches of the alignment head. A safety shield is connected to the barrel and includes a forward portion extending distally beyond the alignment head and an actuator arm extending proximally from the forward portion. A trigger assembly is connected to the main drive to actuate reciprocation of the hammer. The trigger assembly includes a safety release operably associated with the actuation arm of the safety shield.

In still another aspect of the invention, a clip applying apparatus is provided for applying a clip to first and second reinforcing bars. The apparatus includes a barrel having a distal end and a clip receiving cavity. An alignment head is disposed on the distal end of the barrel. The alignment head has first and second pairs of notches for positioning the barrel against the first and second reinforcing bars. The first pair of notches are deeper than the second pair of notches. A hammer is received in the barrel. A main drive is connected to the hammer for reciprocating the hammer within the barrel. A clip track is connected to the barrel. The clip track is aligned with the cavity for guiding a string of frangibly connected clips into the cavity. A safety shield is connected to the barrel and includes a forward portion extending distally beyond the alignment head and an actuation arm extending proximally from the forward portion. The safety shield includes at least one notch aligned with one of the notches of the alignment head. An anti-jamming mechanism is connected to the barrel. The anti-jamming mechanism includes a latch having a first position for engaging the safety shield when a clip string is not fully advanced into the clip receiving cavity to prevent rearward movement of the safety shield and a second position out of engagement with the safety shield. A pneumatic clip feed assembly is operably associated with the main drive so that upon reciprocation of the hammer the clip feed assembly may advance the clip string along the clip track into the cavity.

Numerous objects, features and advantages of the present invention will be readily apparent to those skilled in the art upon a reading of the following disclosure when taken in conjunction with the accompanying drawings.

BRIEF DESCRIPTION OF THE SEVERAL VIEWS OF THE DRAWINGS

In FIG. 11 the cover is closed and there is no clip in the clip receiving cavity.

In FIG. 15 the cover is in a closed position.

DETAILED DESCRIPTION OF THE INVENTION

Figure 18:
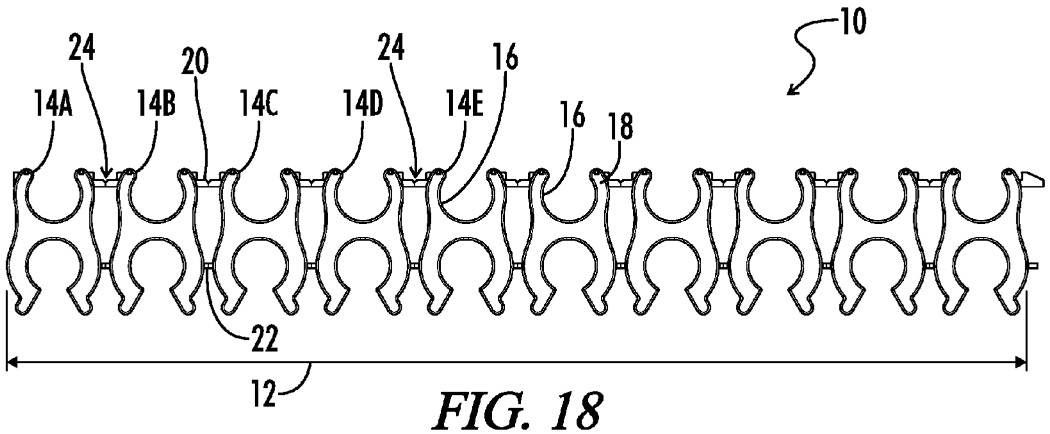
FIG. 18 is an elevation view of a string of frangibly connected clips.

The Clip String of FIG. 18

A clip string or rack 10 of the type generally preferred for use with a clip applicator gun of the present invention is shown in FIG. 18. The clip string 10 has a length 12, with each individual clip 14 having at least one adjacent clip. In FIG. 18 the first five of the clips illustrated are designated as 14A, 14B, 14C, 14D, and 14E. One of the terminal clips such as 14A would only have one adjacent clip such as 14B, whereas a clip in the middle of the string such as 14B would have two adjacent clips 14A and 14C. Each clip 14 is oriented with a cradle 16 defined by an upper body portion 18 of the clip aligned perpendicular to the clip string length 12. When the cradle 16 is perpendicular to the clip string length 12, a bar received in the cradle 16 of the clip 14 would be perpendicular to the length 12 of the clip string 10.

Upper and lower tabs such as 20 and 22 connect adjacent clips 14. The tabs may have indents such as 24 formed therein to facilitate breaking of the tabs when one clip 14 is applied to connect reinforcing bars and must be separated from the adjacent clip 14. The terminal clip such as 14A becomes separated from the clip string 10 when it is applied by the clip applying apparatus of FIG. 2, and the indent 24 provides a breaking point on the tab such as tab 20 to aid in separating the terminal clip 14A.

Figure 19:
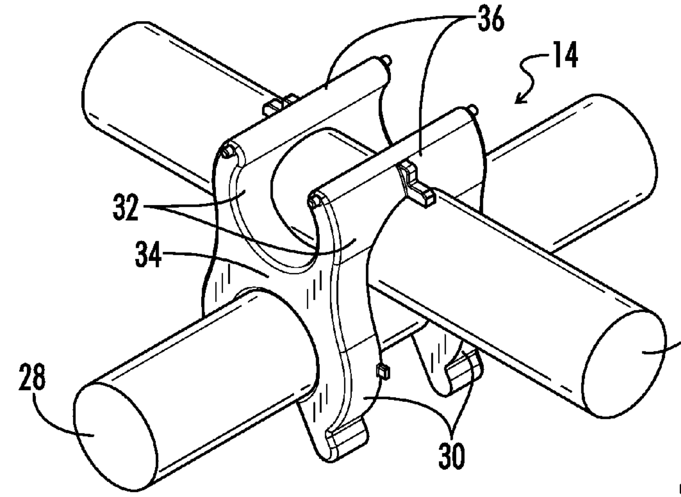
FIG. 19 illustrates one of the clips in place upon to transverse reinforcing bars.

FIG. 19 shows a perspective view of one of the clips 14 in place upon a pair of crossed or transverse reinforcing bars 26 and 28. The clips 14 are preferably molded of plastic, and each includes four hooks 30, four upper bodies 32, two joining portions 34, and two longitudinal supports 36 joining the upper ends of the upper bodies.

Figure 20:
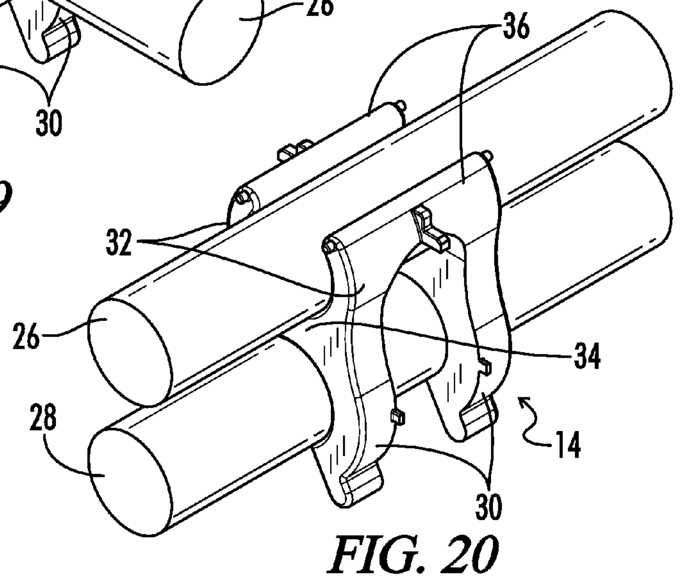
FIG. 20 illustrates one of the clips in place upon two parallel reinforcing bars.

FIG. 20 shows a perspective view of one of the clips 14 in place upon a pair of parallel reinforcing bars 26 and 28.

The Bar Connecting Apparatus

Figure 1:
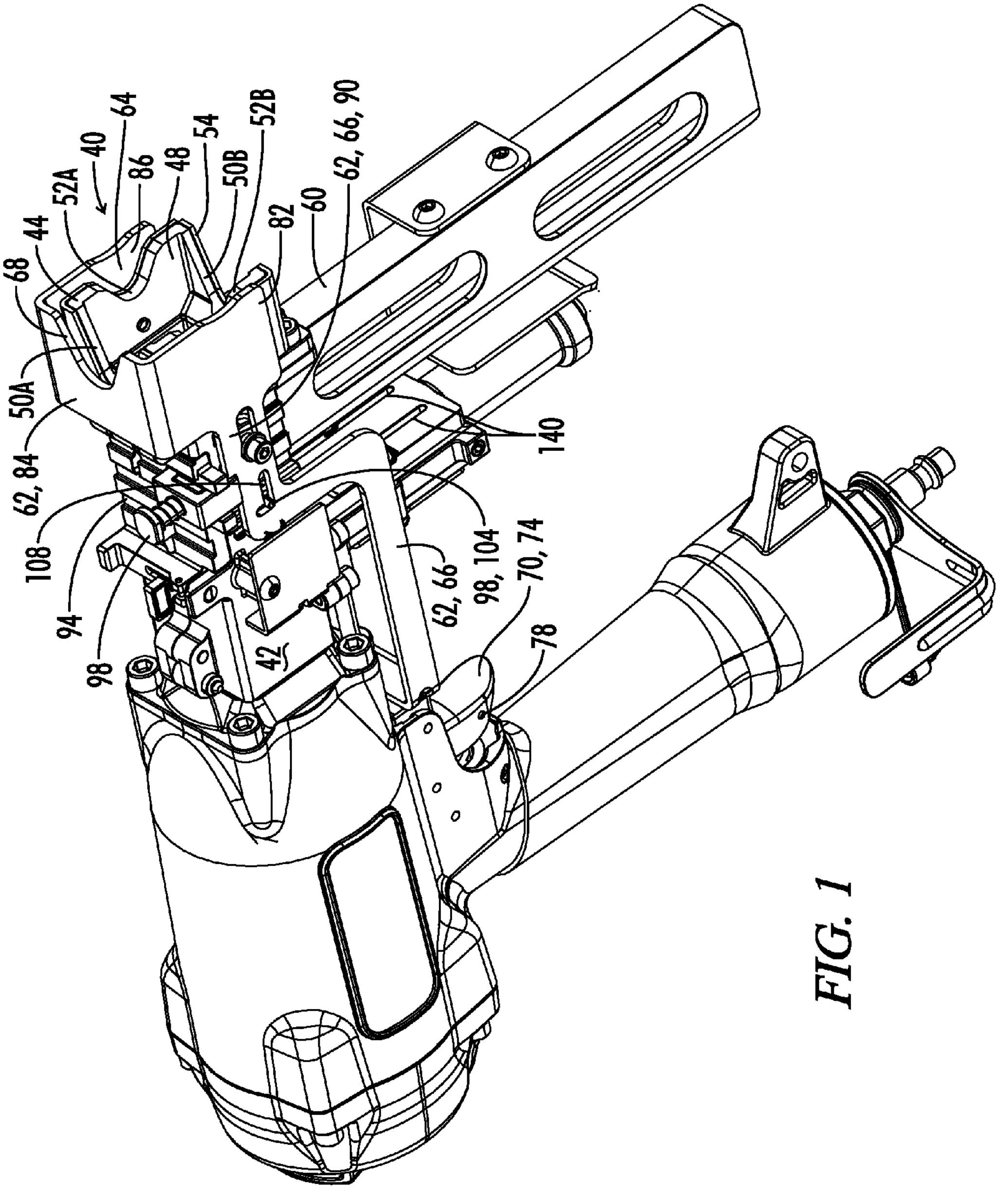
FIG. 1 is a front right hand perspective view of the forward portion of the clip applying apparatus.
Figure 2:
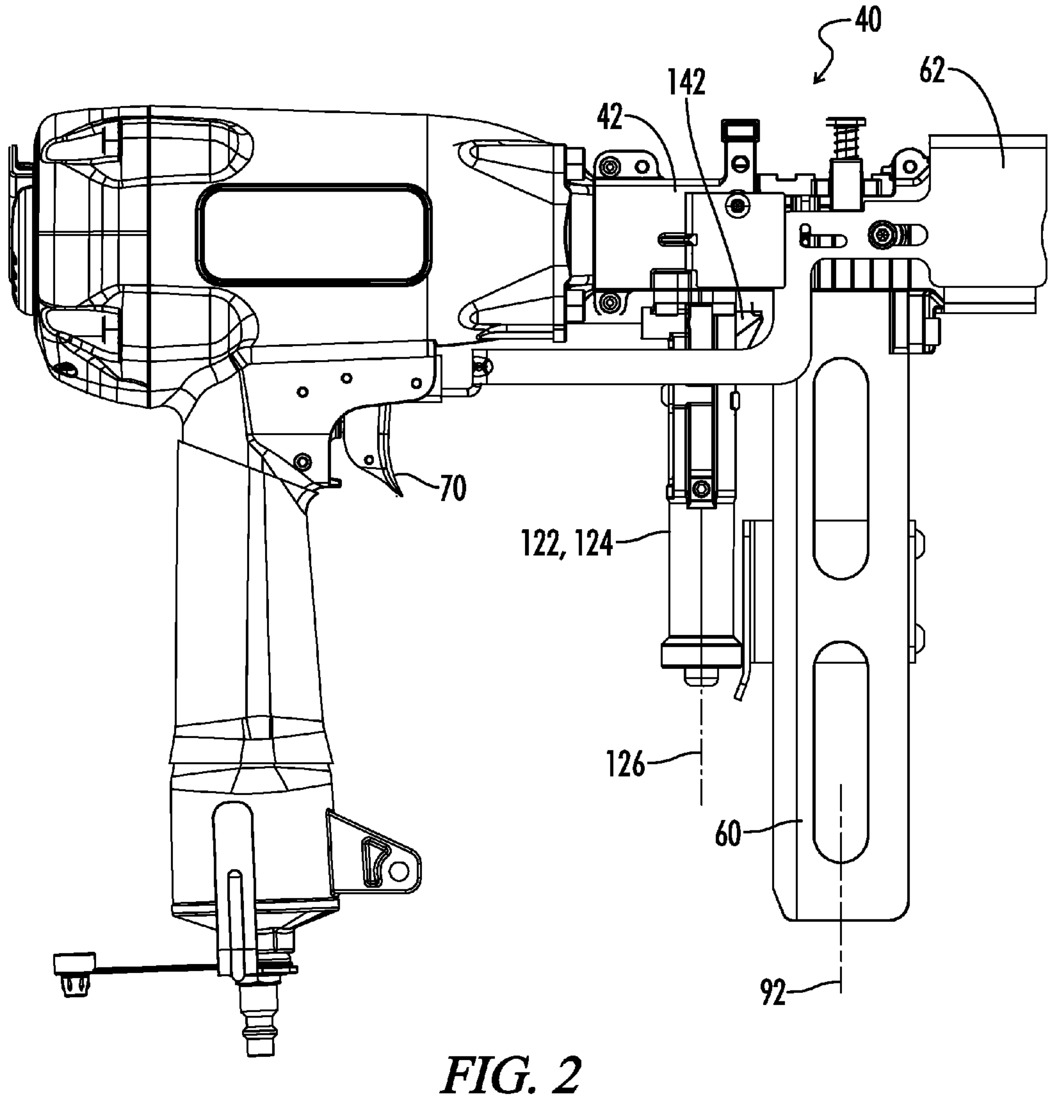
FIG. 2 is a right side elevation view of the apparatus of FIG. 1.
Figure 3:
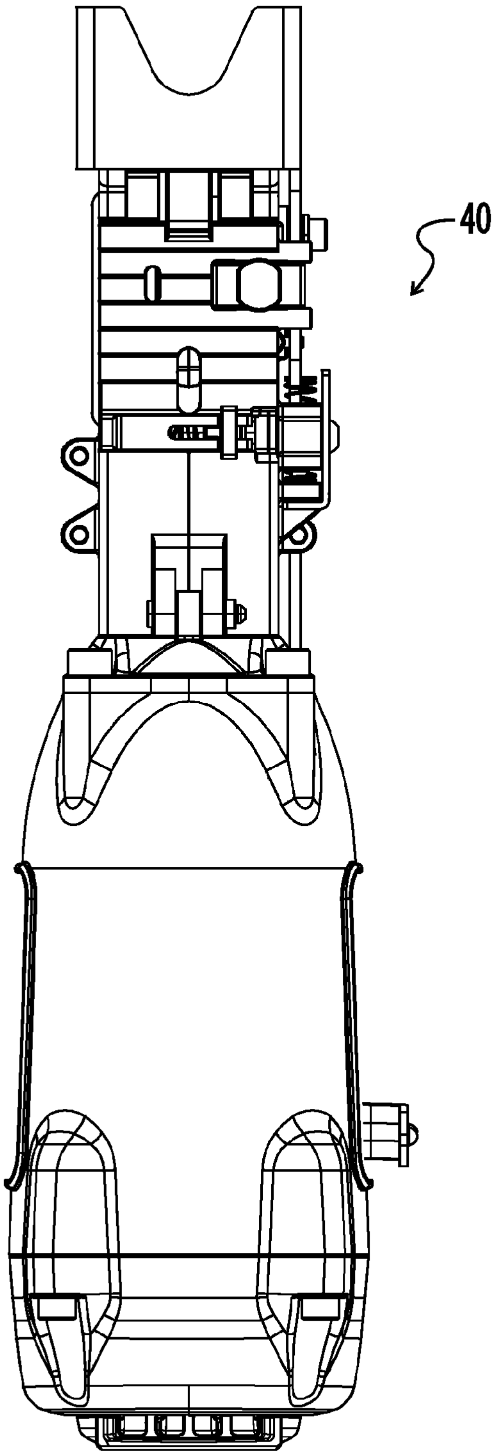
FIG. 3 is a top plan view of the apparatus of FIG. 2.
Figure 4:
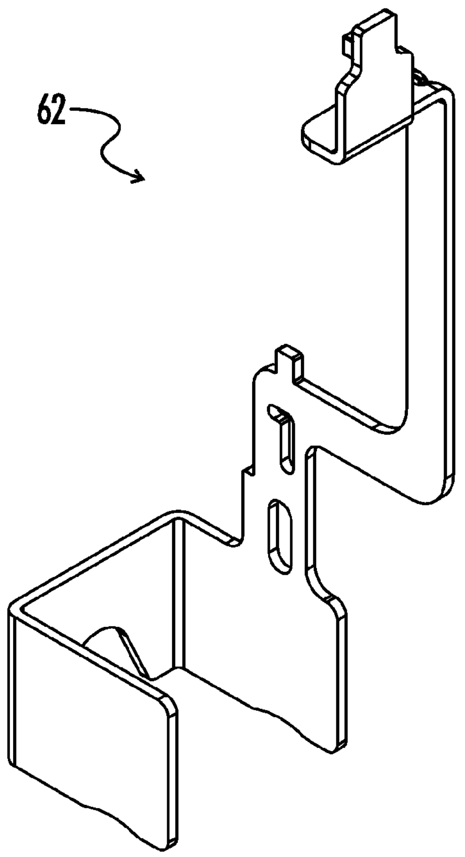
FIG. 4 is a left rear lower perspective view of the safety shield.
Figure 5:
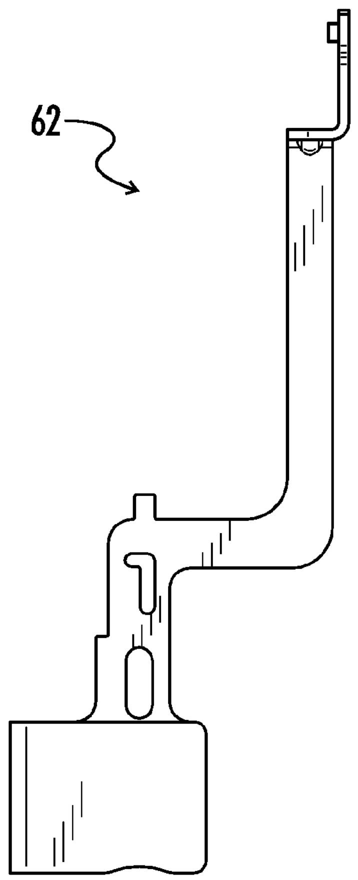
FIG. 5 is a left side elevation view of the safety shield.

The clip string 10 is utilized in a bar connecting apparatus 40 which is shown in side elevation view in FIG. 2. The right side forward portion of the apparatus 40 is shown in perspective view in FIG. 1.

The apparatus 40 includes a barrel 42 having a distal end 44 and having a clip receiving cavity 46 defined therein. The clip receiving cavity 46 is best schematically illustrated in FIGS. 11-14.

An alignment head 48 is integrally formed in the distal end portion of the barrel 40, and includes first and second pairs of notches 50 and 52 for positioning the barrel 42 against the first and second reinforcing bars 26 and 28 when the bars are oriented transversely to each other as shown in FIG. 19. The two notches of the first pair of notches 50 are designated as 50A and 50B for ease of reference. Similarly, the two notches of the second pair of notches 52 are designated as 52A and 52B. The alignment head 48 could also be a separate component attached to barrel 42. Both the integral and separate embodiments of the alignment head can be described as being defined on the distal end of the barrel 42.

Figure 6:
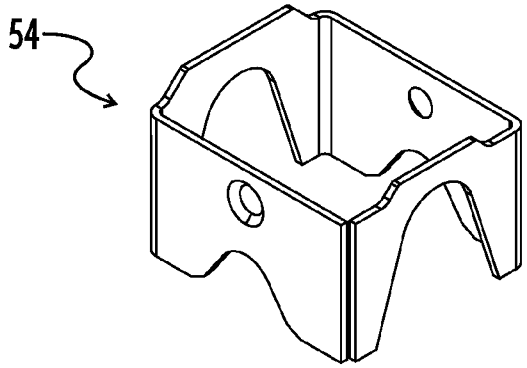
FIG. 6 is a perspective view of a wear guard collar to be received around the distal end of the barrel.

The barrel 42 may be formed from two barrel halves which are bolted together. The forward or distal end of the barrel 42 may be surrounded by a four sided barrel wear plate collar 54 which is best shown in perspective view in FIG. 6 and which includes notches corresponding to the notches 50 and 52 of the barrel 42.

The first pair of notches 50 are deeper than the second pair of notches 52 so that when the alignment head 48 is placed over a pair of transverse bars 26 and 28 as seen in FIG. 19, the seats of the deeper notches 50 can engage the first bar 26 and the seats of the shallower notches 52 can engage the second bar 28 to position the apparatus 40 in place upon the crossed bars 26 and 28 which are to be joined by one of the clips 14. If the clip is to be applied to two parallel bars as shown in FIG. 20, both bars are received in the deeper notches 50 with the uppermost bar resting in the seats of the deeper notches 50.

Figure 9:
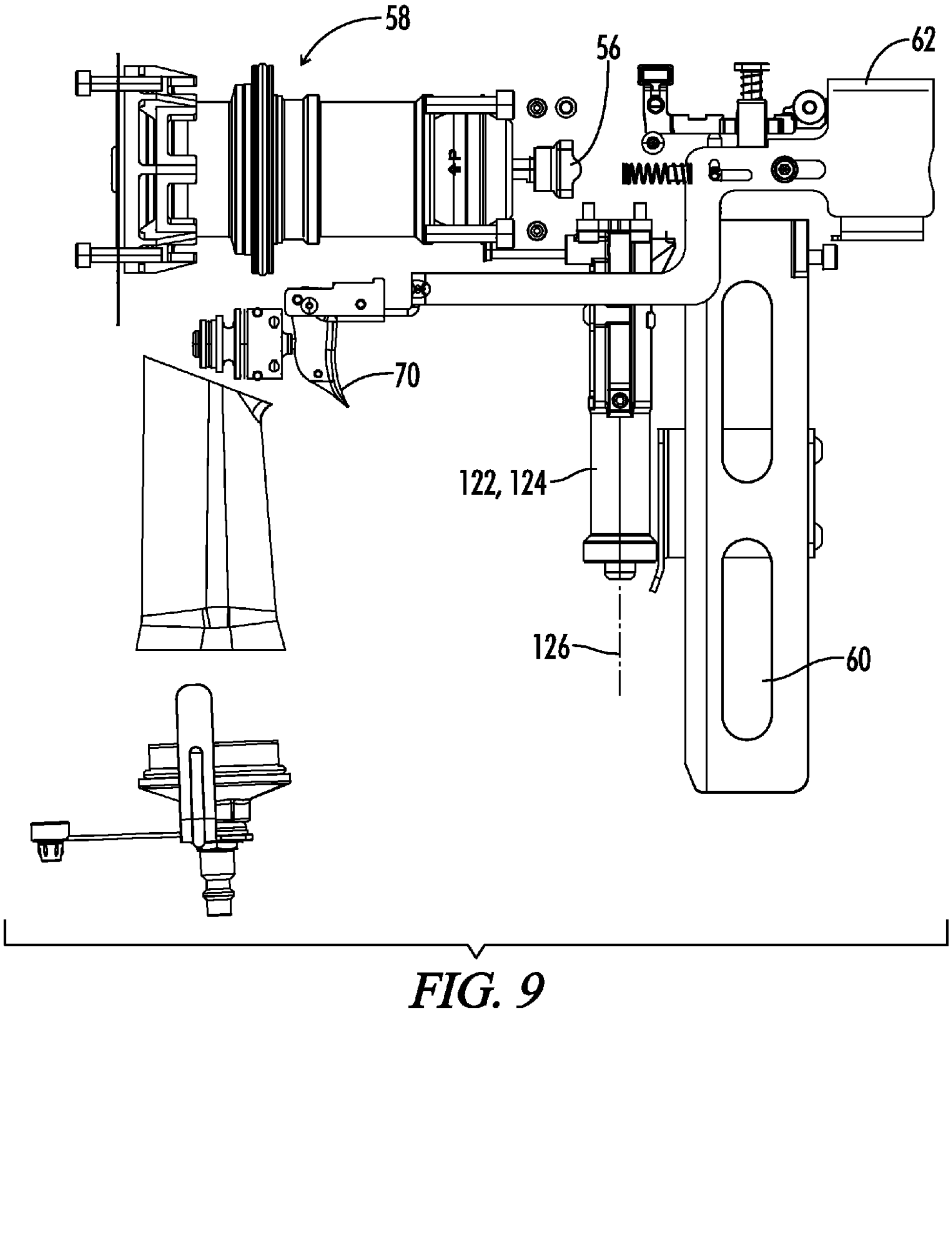
FIG. 9 is a right side elevation view of the apparatus of FIG. 2 with certain external housing components removed so as to show the internal relationship of the various components of the apparatus.

As best seen for example in FIG. 9, a hammer 56 is reciprocably received within the barrel 42 for driving the clips 14 onto the bars 26 and 28. As also seen in FIG. 9, a main drive 58 is connected to the hammer 56 for reciprocating the hammer 56 within the barrel 42. As will be further described below, the main drive 58 may be pneumatically powered.

A clip track 60 is connected to the barrel 42 and aligned with the cavity 46 for guiding the string 10 of frangibly connected clips 14 into the cavity 46.

A safety shield 62 is reciprocably connected external of the barrel 42 and includes a forward portion 64 extending distally beyond the alignment head 48. The safety shield 62 also includes an actuation arm 66 extending proximally from the forward portion 64.

As best seen in FIG. 1, the safety shield 62 includes at least one notch 68 which is aligned with the first pair of notches 50 of the alignment head 48.

Figure 10:
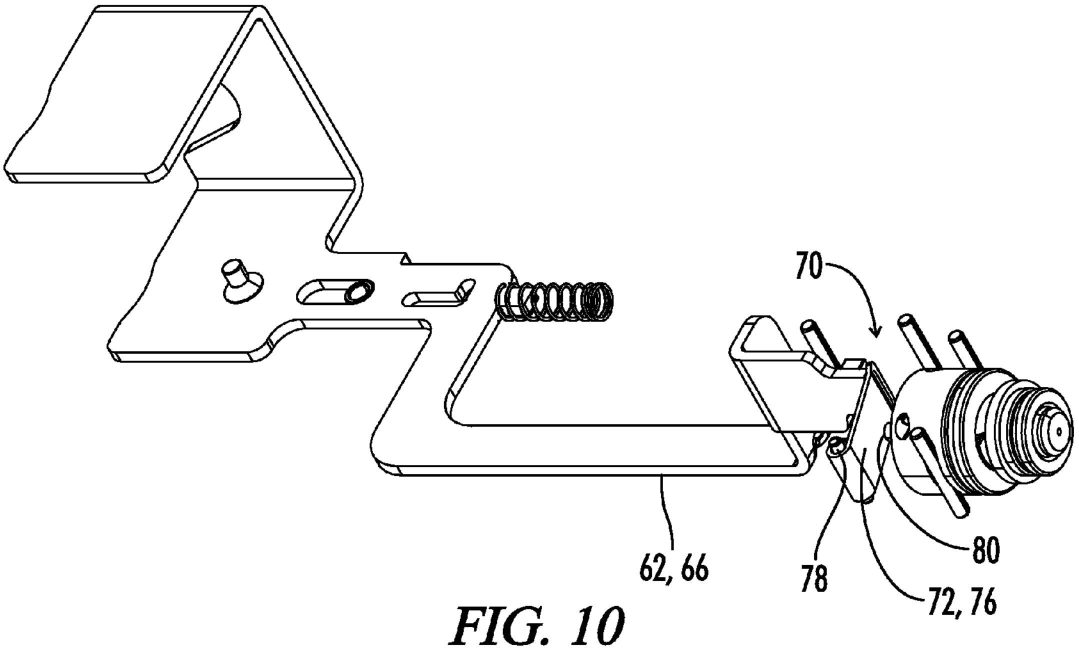
FIG. 10 is a perspective view showing the relationship between the safety shield and the trigger assembly.

As best shown in FIGS. 1 and 10, a trigger assembly 70 is connected to the main drive 58 to actuate reciprocation of the hammer 56. The trigger assembly 70 includes a safety release 72 operably associated with the actuation arm 66 of the safety shield 62. The trigger assembly 70 includes a trigger 74 which has a safety lever 76 pivotally connected thereto at pivot pin 78.

If the safety shield 62 is in its rearward position as further described below, it pivots the safety lever 76 rearward until lever 76 engages a pneumatic valve actuator 80 (see FIG. 10). Then, if a human operator squeezes trigger 74 the trigger 74 and the lever 76 move further rearward to depress the valve actuator 80, which will direct pressurized air to the pneumatic drive 58 and to the pneumatic clip feed mechanism further described below. If the safety shield 62 is not in its rearward position, squeezing the trigger 74 cannot depress the valve actuator 80. Thus, as further described below, unless the distal or forward portion of the safety shield 62 is engaged with the reinforcing bars 26 and 28, the trigger assembly 70 is inoperable and the apparatus 40 cannot fire one of the clips from the barrel 42.

Returning to FIG. 1, it is there seen that the barrel 42 has a generally rectangular cross section including four sides. The forward portion of the safety shield 62 includes at least three sides such as 82, 84 and 86 overlying three of the four sides of the barrel 42 adjacent the distal end 44 of the barrel 42. Also, a forward portion 90 of the actuation arm 66 immediately proximal of the forward portion 64 of the safety shield 62 extends along side the right side of barrel 42.

As best seen in FIG. 2, the clip track 60 can be described as having a longitudinal axis 92 extending transversely from the barrel 42. It is noted that the first pair of notches 50 are aligned with each other in a first alignment direction parallel to the longitudinal axis 92 of the clip track 60.

As previously noted, one purpose of the safety shield 62 is provided by its interaction with the trigger assembly 70 so that the apparatus 40 cannot be fired unless the distal end of the safety shield 62 and the alignment head 48 are engaged with bars such as 26 and 28 so that the safety shield 62 is moved a short distance proximally relative to the alignment head 48 thus actuating the safety release lever 76 of the trigger assembly 70. The safety shield 62 is involved with two other safety features of the apparatus 40 which will now be described.

Figure 14:
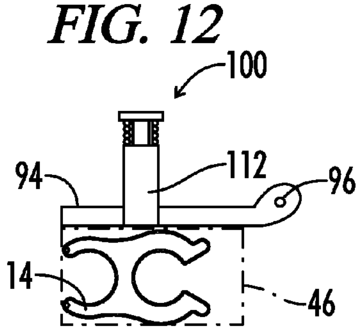
FIG. 14 is a schematic view similar to FIG. 12 showing the position of the anti-jamming mechanism when a clip is received in the clip receiving cavity.
Figure 15:
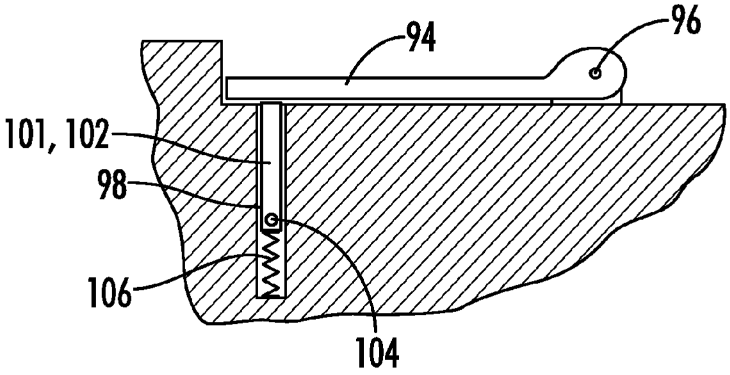
FIG. 15 is a schematic view illustrating a second safety feature, namely a release pin for preventing operation of the apparatus if the cover of the clip receiving cavity is not closed.
Figure 16:
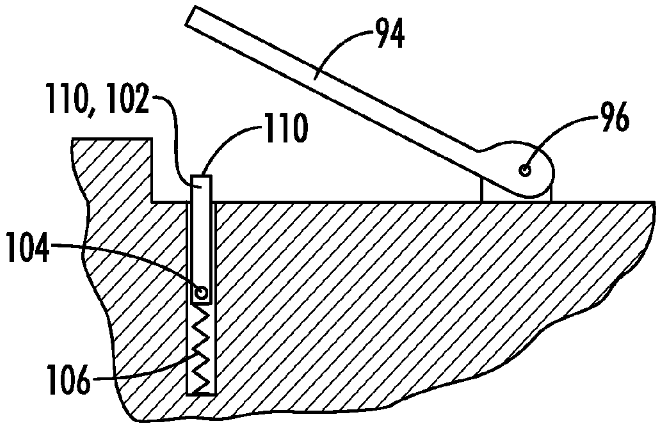
FIG. 16 is a schematic view similar to FIG. 15 showing a safety position of the release pin when the cover is in an open position.
Figure 17:
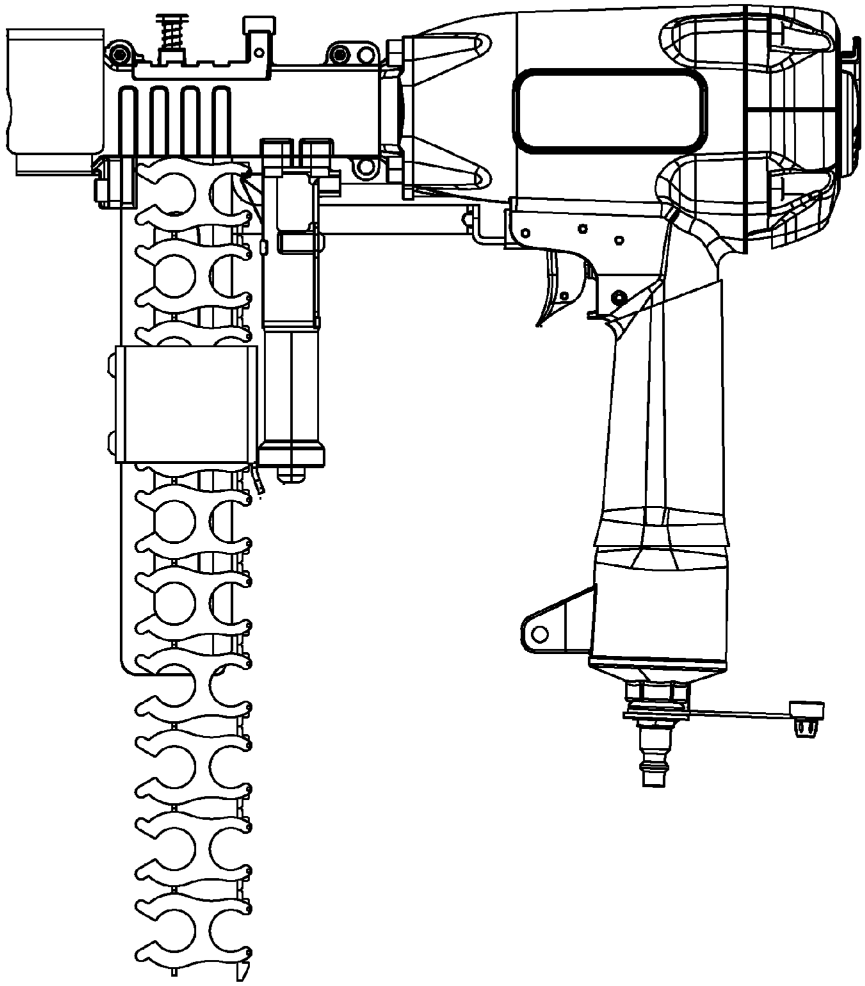
FIG. 17 is a left side elevation view showing the apparatus of FIG. 2 with a string of frangibly connected clips in place therein.

As best seen in FIGS. 11-16, a removable cover 94 is pivotally attached to barrel 42 at pivot pin 96 and when in its closed position covers a top side of the clip receiving cavity 46 within the barrel 42. The cover 94 can be pivoted to an open position as schematically illustrated in FIG. 16 to allow the clip string 10 to be moved upward through the cavity 46 for removal from the apparatus 40 as is further described below.

As seen in FIGS. 15-16, one of the additional safety features is the provision of a safety latch 98 interconnecting the cover 94 to the safety shield 62 to prevent proximal movement of the safety shield 62 relative to the barrel 42 and thus to prevent operation of the apparatus 40 unless the cover 94 is in its closed position.

As seen in FIGS. 11-14, a third safety feature is provided by an anti-jamming mechanism 100 which prevents rearward or proximal movement of the safety shield 62 relative to barrel 42 and thus prevents operation of the apparatus 40 unless a clip string 10 is fully advanced into the clip receiving cavity 46.

The operation of the safety latch 98 is best shown in the schematic views of FIGS. 15 and 16. In FIG. 16, when the cover 94 is in an open position, the safety latch 98 is in a safety position that will prevent proximal movement of the safety shield 62. Then as shown in FIG. 15, if the cover 94 is closed the safety latch 98 moves downward which will allow operation of the apparatus 40 in the following manner.

The safety latch 98 includes a release pin 101. Release pin 101 includes a vertical portion 102 and a lateral portion 104. Vertical portion 102 has a first extended end 110. Lateral portion 104 may be referred to as a second extended end 104. The first extended end 110 engages the cover 94 when the cover is in the closed position. The second extended end 104 engages the safety slot in the safety shield 62 when the cover is in the open position to prevent proximal movement of the safety shield. The laterally extending pin 104 is best seen in FIG. 1 where it is shown protruding through the safety shield 62. The release pin 101 is biased upward by a resilient spring 106.

As seen in FIG. 1, the safety shield 62 has an L-shape safety slot 108 defined therein, and the lateral pin 104 of safety latch 98 extends into the short vertical leg of safety slot 108. The lateral pin 104 may be referred to as a release pin 104 for engaging the safety slot 108 when the cover is in the open position.

If the cover 94 is moved to the open position as schematically shown in FIG. 16, the release pin 104 will move laterally upward as shown in FIG. 16 and will move into the upper portion of the short vertical leg of safety slot 108, thus preventing rearward movement of the safety shield 62 relative to barrel 42. However, when the cover 94 is closed as shown in FIG. 15 and FIG. 1, the release pin 104 moves downward into alignment with the long horizontal portion of L-shaped safety slot 108, thus permitting the safety shield 62 to slide rearward relative to barrel 42.

Figure 11:
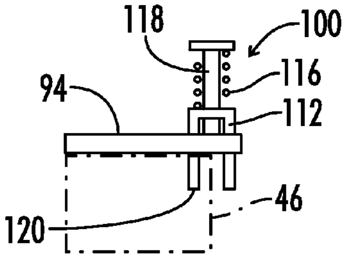
FIG. 11 is a schematic rear view of the clip receiving cavity, the cover for the clip receiving cavity, and the latch of the anti-jamming mechanism for preventing operation of the apparatus when a clip string is not fully advanced into the clip receiving cavity.
Figure 12:
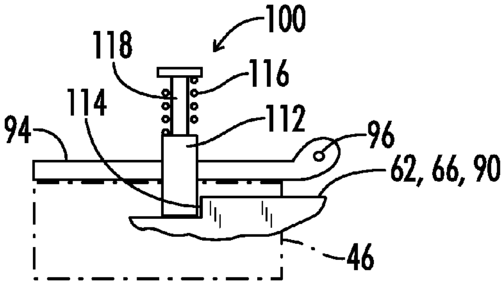
FIG. 12 is a schematic right side elevation view of the clip receiving cavity, cover, and anti-jamming mechanism of FIG. 11.

Referring now to FIGS. 11-14, the operation of the anti-jamming mechanism 100 is there schematically illustrated. The anti-jamming mechanism includes a latch 112 having a first position shown in FIGS. 11 and 12 for engaging the safety shield 62 when a clip string 10 is not fully advanced into the clip receiving cavity 62, thus preventing rearward movement of the safety shield 62. The latch 112 further has a second position schematically illustrated in FIGS. 13 and 14 wherein the latch 112 is out of engagement with the safety shield 62 thus permitting rearward movement of the safety shield 62. As seen in FIG. 12, the safety shield 62 has a safety step 114 formed therein for engaging the latch 112 when the clip string 10 is not fully advanced into the clip receiving cavity 62. A spring 116 biases the latch 112 downward toward its safety position of FIGS. 11 and 12.

Figure 13:
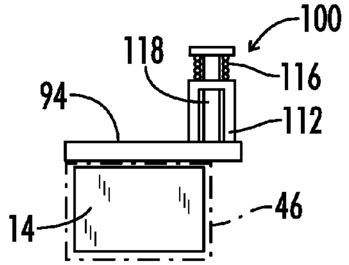
FIG. 13 is a schematic rear view similar to FIG. 11 showing the position of the anti-jamming mechanism when a clip is received in the clip receiving cavity.

As best seen in FIGS. 11 and 13, the latch 112 is a U-shaped member. A post 118 is rigidly attached to the cover 94 and extends upwardly therefrom through the U-shaped latch member 112. The U-shaped latch member 112 can reciprocate upward and downward upon the post 118. The spring 116 may be a coil spring disposed about the post 118 and urging the U-shaped latch member 112 downwardly.

As seen in FIGS. 11 and 12, when there is no clip 14 received in the clip receiving cavity 46, the latch 112 is moved downwardly by spring 116 so that one leg thereof engages the safety shield 62 as seen in FIG. 12, and the other leg thereof extends downward into the clip receiving cavity 46. However, when one of the clips 14 is fully received in the clip receiving cavity 46 as schematically illustrated in FIGS. 13 and 14, the clip 14 engages the lower end 120 of the inside leg of the U-shaped latch 112 thus pushing the latch 112 upward to the position shown in FIGS. 13 and 14.

The Pneumatic Clip Feed Assembly

Figure 7:
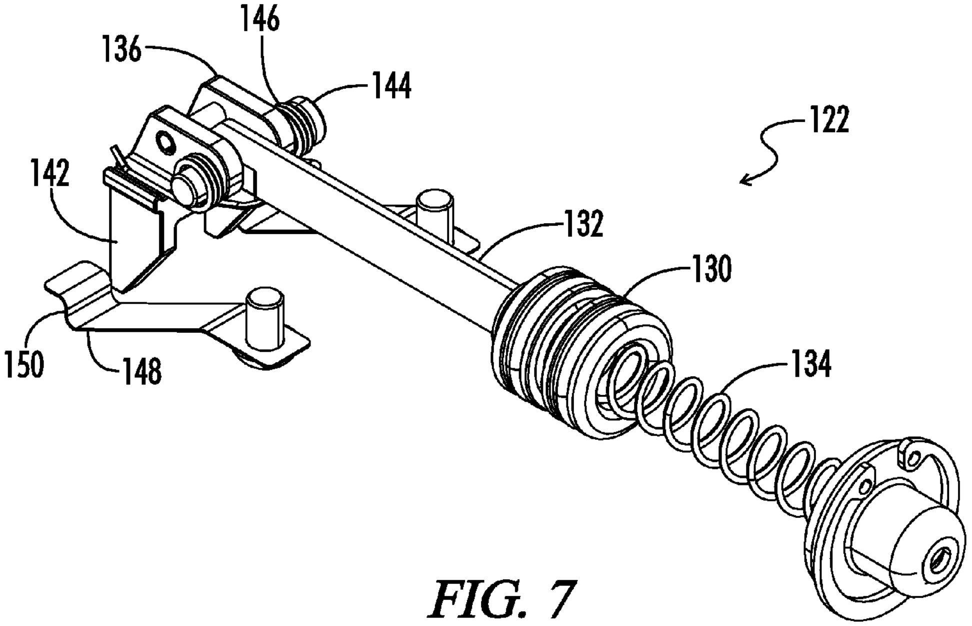
FIG. 7 is a perspective exploded view of the internal components of the pneumatic clip feed assembly.
Figure 8:
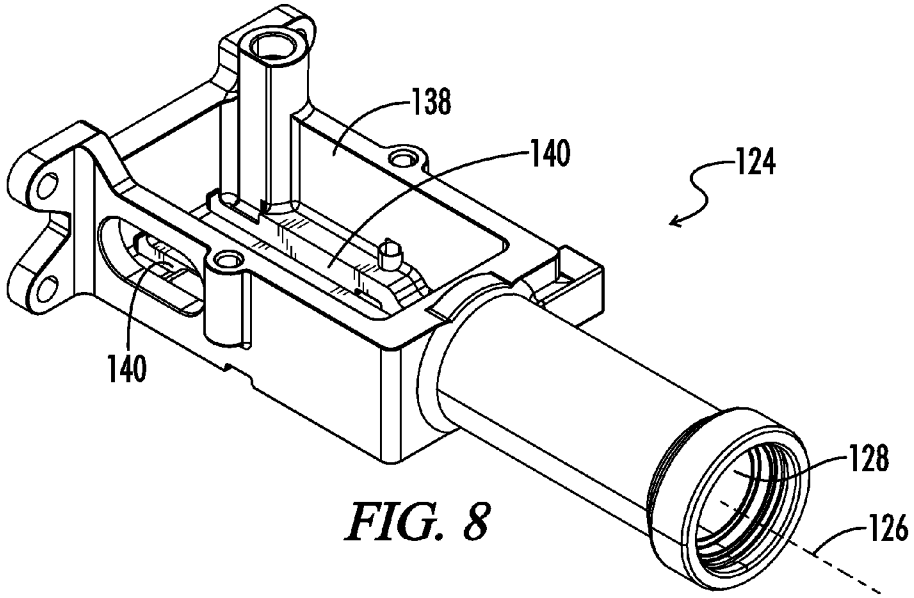
FIG. 8 is a perspective view of the cylinder housing of the pneumatic clip feed assembly which contains the components shown in FIG. 7.

The apparatus 40 may also include a pneumatic clip feed assembly 122 the details of which are best shown in FIGS. 7 and 8. The pneumatic clip feed assembly 122 is operably associated with the pneumatic main drive 58 so that upon reciprocation of the hammer 56 the clip feed assembly 122 may advance the clip string 10 along the clip track 60 into the clip receiving cavity 46.

The pneumatic clip feed assembly 122 further includes a cylinder 124 which may also be referred to as a cylinder housing 124 connected to the barrel 42 and extending laterally downward therefrom. The cylinder housing 124 has an axis 126 extending laterally outward, and preferably downward, from the barrel 42 as shown in FIG. 2. A perspective view of the cylinder housing 124 is shown in FIG. 8. The cylinder housing 124 includes a cylindrical bore 128 within which is slidably received a piston 130. The piston 130 is attached to a piston shaft 132. A coil compression 134 is disposed in the cylindrical bore 128 laterally outwardly from the piston 130, and engaging the piston 130, so that the spring 134 acts as a return spring biasing the piston 130 toward the barrel 42. The end of the piston shaft 132 closest to the barrel 42 has a clip catch 136 pivotally attached thereto for pushing the clip string 10 into the clip receiving cavity 46.

The cylinder housing 124 includes an inner portion 138 within which the piston shaft 132 and the clip catch 136 are received. The laterally inward portion 138 has a pair of slots such as 140 in one wall thereof through which a pair of fingers such as 142 on the clip catch 136 extend. The slots 140 are best seen in FIG. 1. As can be seen in FIG. 2, the fingers 142 extend forward out of the slots 140 into the proximity of the guidetrack 60 so that they may engage the clip string 10.

As seen in FIG. 7, the clip catch 136 with its fingers 142 is pivotally attached to piston shaft 132 at pivot pin 144. A spring 146 biases the catch 136 toward the extended position of the fingers 142 as shown in FIG. 7. As is further described below, upward motion of the clip string 10 relative to the fingers 142 is permitted by the fingers 142 pivoting upward to allow the clip string 10 to move by.

Thus, when the apparatus 40 is actuated via the trigger assembly 70 to direct compressed air or other gas to the pneumatic main drive 58 and to the pneumatic clip feed assembly 122, gas forces the piston 130 laterally outward and the piston 130 and piston shaft 132 and catch member 136 move laterally outward relative to the clip string 10. During that movement, the fingers 142 are allowed to flip up via the action of the spring 146 so that the catch member 136 ratches laterally outward past the clip string 10 by approximately the length of one of the clips 14. Then upon release of the pneumatic pressure, the return spring 134 pushes the piston and piston shaft 132 laterally inward toward barrel 42. The fingers 142 catch under the next one of the clips 14 of clip string 10 so that the clip string 10 is moved laterally inward toward barrel 42 thus advancing the next clip into the clip receiving cavity 46.

Also as seen in FIG. 7, there is a pair of resilient catches 148 mounted on the forward side of the cylinder housing 124 and extending into engagement with the clip string 10. The catches have a step 150 defined on their upper end for catching under one of the clips 14 of the clip string 10 to prevent the clip string 10 from moving laterally outward away from barrel 42 when the piston 130 with its catch member 136 moves laterally outward relative to the barrel 42.

Manner of Operation

The general operation of the apparatus 40, and particularly of the safety shield 62 thereof with its various safety features is as follows.

When it is desired to apply one of the clips 14 to the crossed reinforcing bars 26 and 28 as shown in FIG. 19, the distal end of the barrel 42 is placed over the crossed bars so that the top or first bar 26 is received in the deeper notches 50 of alignment head 48, and so that the bottom or second bar 26 is received within the notches 52. This moves the safety shield 62 backward or proximally relative to barrel 42 thus enabling the trigger assembly 70 so that the apparatus 40 can be fired by pulling the trigger 70. Similarly, the deeper notches 50 can be placed over two parallel bars to place a clip as shown in FIG. 20.

When the trigger 70 is pulled, compressed air or other pneumatic gas is directed to the main drive 58 to drive the hammer 56 forward to expel the clip 14 located in the clip receiving cavity 46 from the barrel 42 and place it over the bars 26 and 28 as shown in FIG. 19 or 20. Compressed air is also directed to the piston 130 to move it laterally outward within the cylindrical bore 128 thus moving the fingers 142 of catch member 136 laterally outward below one of the clips 14 of the clip string 10. Upon releasing the trigger 70 the pneumatic pressure is released, the hammer 56 is retracted, and the return spring 134 moves the piston 130 back toward the barrel 42. That movement of piston 130 also moves the catch member 136 which pulls the clip string 10 toward the barrel 42 to advance the next clip into the clip receiving cavity 46.

If the cover 94 is open, operation of the apparatus 40 is prevented because the safety latch 98 will have its laterally extending pin 104 received in the short vertical leg of L-shaped safety slot 108 of actuating arm 66 of safety shield 62 thus preventing the rearward movement of safety shield 62 upon pressing the same against the bars 26 and 28.

Similarly, even if the cover 94 is closed, if there is not also a clip 14 fully received in the clip receiving cavity 46, the anti-jamming mechanism 100 will prevent operation of the apparatus 40 because the latch member 112 will be in its safety position as shown in FIGS. 11 and 12 engaging the safety step 114 of safety shield 62, again preventing rearward movement of safety shield 62 relative to barrel 42.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. An apparatus for applying a clip to first and second reinforcing bars, comprising:

- a barrel having a distal end and a clip receiving cavity;
- an alignment head defined on the distal end of the barrel, the alignment head having first and second pairs of notches for positioning the barrel against the first and second reinforcing bars when the bars are oriented transversely to each other, the first pair of notches being deeper than the second pair of notches;
- a hammer received in the barrel;
- a main drive, connected to the hammer, for reciprocating the hammer within the barrel;
- a clip track connected to the barrel, the clip track aligned with the cavity for guiding a string of frangibly connected clips into the cavity;

a safety shield, connected to the barrel, including a forward portion extending distally beyond the alignment head and an actuation arm extending proximally from the forward portion, the safety shield including at least one notch aligned with the first pair of notches of the alignment head; and a trigger assembly, connected to the main drive, to actuate reciprocation of the hammer, the trigger assembly including a safety release operably associated with the actuation arm of the safety shield.

2. The apparatus of claim 1, wherein:

the clip track has a longitudinal axis extending transversely from the barrel; and the first pair of notches of the alignment head are aligned with each other in a first alignment direction parallel to the longitudinal axis of the clip track.

3. The apparatus of claim 2, wherein:

the barrel has a rectangular cross-section including four sides; and the forward portion of the safety shield includes at least three sides overlying three of the four sides of the barrel adjacent the distal end of the barrel.

4. The apparatus of claim 1, wherein:

the barrel has a rectangular cross-section including four sides; and the forward portion of the safety shield includes at least three sides overlying three of the four sides of the barrel adjacent the distal end of the barrel.

5. The apparatus of claim 1, wherein:

at least a portion of the actuation arm of the safety shield immediately proximal of the forward portion of the safety shield extends alongside the barrel.

6. The apparatus of claim 1, further comprising:

a removable cover attached to the barrel, the cover having a closed position and an open position, the open position permitting a clip string to be advanced along the clip track and through the cavity to remove the clip string from the apparatus; and, a safety latch, connecting the cover to the safety shield, the latch having a safety position that prevents proximal movement of the safety shield relative to the barrel unless the cover is in its closed position.

7. The apparatus of claim 6, further comprising:

the safety shield defining a safety slot thereon;

the safety latch having a release pin for engaging the safety slot when the cover is in the open position to prevent proximal movement of the safety shield relative to the barrel; and the release pin having a first extended end and a second extended end, the first extended end engaging the removable cover when the cover is in the closed position, the second extended end engaging the safety slot in the safety shield when the cover is in the open position preventing proximal movement of the safety shield relative to the barrel.

8. The apparatus of claim 1, further comprising:

an anti-jamming mechanism connected to the barrel, the anti-jamming mechanism including a latch having a first position for engaging the safety shield when a clip string is not fully advanced into the clip receiving cavity to prevent rearward movement of the safety shield and a second position out of engagement with the safety shield.

9. The apparatus of claim 8, further comprising:

the safety shield having a safety step for engaging the anti-jamming mechanism when a clip string is not fully advanced into the clip receiving cavity; and a spring for biasing the latch toward the first position.

10. The apparatus of claim 8, wherein:

the latch extends into the clip receiving cavity when the latch is in the first position so that receipt of a clip in the clip receiving cavity will move the latch to the second position.

11. The apparatus of claim 1, further comprising:

a pneumatic clip feed assembly, operably associated with the main drive so that, upon reciprocation of the hammer, the clip feed assembly may advance the clip string along the clip track into the cavity.

12. The apparatus of claim 11, wherein the pneumatic clip feed assembly further comprises:

a cylinder connected to the barrel for receiving compressed gas, the cylinder having an axis extending laterally outward from the barrel;

a piston slidably received in the cylinder;

a compression coil return spring disposed in the cylinder and engaging the piston, the return spring biasing the piston toward the barrel; and a clip catch connected to the piston for pushing the clip into the clip receiving cavity.

13. The apparatus of claim 11, wherein the pneumatic clip feed assembly further comprises:

a pneumatic clip feed housing having a slot therein;

a clip feed piston slidably received in the pneumatic clip feed housing; and a clip feed finger for urging a clip into the clip receiving cavity, the finger having a first end connected to the clip feed piston and a second end extending outward through the slot in the pneumatic clip feed housing.

14. The apparatus of claim 13, wherein the pneumatic clip feed drive further comprises a coil compression return spring positioned in the pneumatic clip feed housing, the return spring engaging the clip feed piston to bias the piston toward the clip receiving cavity.

15. An apparatus for applying a clip to first and second reinforcing bars, comprising:

a barrel having a distal end and a clip receiving cavity;

an alignment head defined on the distal end of the barrel, the alignment head having first and second pairs of notches for positioning the barrel against first and second transverse reinforcing bars, the first pair of notches being deeper than the second pair of notches;

a hammer received in the barrel;

a main drive, connected to the hammer, for reciprocating the hammer within the barrel;

a clip track connected to the barrel, the clip track having a longitudinal axis extending transversely from the barrel and aligned with the cavity for guiding a string of frangibly connected clips into the cavity, the longitudinal axis of the clip track being parallel to an alignment direction defined by the first pair of notches of the alignment head;

a safety shield connected to the barrel, including a forward portion extending distally beyond the alignment head and an actuation arm extending proximally from the forward portion; and a trigger assembly, connected to the main drive, to actuate reciprocation of the hammer, the trigger assembly including a safety release operably associated with the actuation arm of the safety shield.

16. The apparatus of claim 15, wherein:

the barrel has a rectangular cross-section including four sides; and the forward portion of the safety shield includes at least three sides overlying three of the four sides of the barrel adjacent the distal end of the barrel.

17. The apparatus of claim 16, wherein:

the first pair of notches of the alignment head are sufficiently deep to extend over the first and second reinforcing bars when the bars are oriented parallel to each other.

18. The apparatus of claim 16, wherein:

the forward portion of the safety shield includes at least one notch aligned with the first pair of notches of the alignment head.

19. The apparatus of claim 18, wherein:

the at least one notch of the safety shield is located in a middle one of the at least three sides of the forward portion of the safety shield.

20. An apparatus for applying a clip to first and second reinforcing bars, comprising:

a barrel having a distal end and a clip receiving cavity;

an alignment head defined on the distal end of the barrel, the alignment head having first and second pairs of notches for positioning the barrel against the first and second reinforcing bars when the bars are oriented transversely to each other, the first pair of notches being deeper than the second pair of notches;

a hammer received in the barrel;

a main drive, connected to the hammer, for reciprocating the hammer within the barrel;

a clip track connected to the barrel, the clip track aligned with the cavity for guiding a string of frangibly connected clips into the cavity;

a safety shield, connected to the barrel, including a forward portion extending distally beyond the alignment head and an actuation arm extending proximally from the forward portion, the safety shield including at least one notch aligned with one of the notches of the alignment head;

a trigger assembly, connected to the main drive, to actuate reciprocation of the hammer, the trigger assembly including a safety release operably associated with the actuation arm of the safety shield;

an anti-jamming mechanism connected to the barrel, the anti-jamming mechanism including a latch having a first position for engaging the safety shield when a clip string is not fully advanced into the clip receiving cavity to prevent rearward movement of the safety shield and a second position out of engagement with the safety shield; and a pneumatic clip feed assembly, operably associated with the main drive so that, upon reciprocation of the hammer, the clip feed assembly advances the clip string along the clip track into the cavity.

* * * * *